US00RE47618E

(19) United States
(12) Reissued Patent
Ruchser et al.

(10) Patent Number: US RE47,618 E
(45) Date of Reissued Patent: Sep. 24, 2019

(54) ACID DYE MIXTURE

(71) Applicant: DyStar Colours Distribution GmbH, Raunheim (DE)

(72) Inventors: Thomas Ruchser, Griesheim (DE); Andreas Giehl, Niedernhausen (DE)

(73) Assignee: DyStar Colours Distribution GmbH (DE)

(21) Appl. No.: 15/647,821

(22) Filed: Jul. 12, 2017

Related U.S. Patent Documents

Reissue of:
(64) Patent No.: 8,323,358
Issued: Dec. 4, 2012
Appl. No.: 11/347,923
Filed: Feb. 6, 2006

U.S. Applications:
(60) Provisional application No. 60/650,475, filed on Feb. 7, 2005.

(51) Int. Cl.

| | |
|---|---|
| ***C09B 67/22*** | (2006.01) |
| ***D06P 1/00*** | (2006.01) |
| ***D06P 3/24*** | (2006.01) |
| ***D06P 3/02*** | (2006.01) |
| ***D06P 3/06*** | (2006.01) |
| ***D06P 3/16*** | (2006.01) |
| ***D06P 1/06*** | (2006.01) |

(52) U.S. Cl.
CPC ..... *D06P 1/0096* (2013.01); *C09B 67/0051* (2013.01); *C09B 67/0055* (2013.01); *D06P 1/06* (2013.01); *D06P 3/021* (2013.01); *D06P 3/06* (2013.01); *D06P 3/16* (2013.01); *D06P 3/241* (2013.01)

(58) Field of Classification Search
CPC ..... D06P 1/0096; D06P 3/241; D06P 3/16; D06P 3/06; D06P 1/06; D06P 3/021; C09B 67/0051; C09B 67/0055
See application file for complete search history.

(56) References Cited

U.S. PATENT DOCUMENTS

| | | | | |
|---|---|---|---|---|
| 4,537,598 | A | 8/1985 | Schaetzer et al. | |
| 5,090,964 | A | 2/1992 | Mausezahl | |
| 5,092,906 | A | 3/1992 | Mausezahl et al. | |
| 5,131,919 | A | 7/1992 | Mausezahl | |
| 6,030,420 | A * | 2/2000 | Adam | 8/641 |
| 6,443,998 | B1 | 9/2002 | Jones | |

FOREIGN PATENT DOCUMENTS

| | | |
|---|---|---|
| EP | 0 181292 | 5/1986 |
| EP | 0 430 877 | 6/1991 |
| EP | 0 651 028 | 5/1995 |
| EP | 0 658 605 | 6/1995 |
| EP | 0 823 505 | 2/1998 |
| EP | 0 924 266 | 6/1999 |
| GB | 2 236 542 | 10/1991 |

OTHER PUBLICATIONS

Colourtex Colocid Red BL (mixture of AR-426 (formula I) + AR-337 (formula IIb)+ AB-324 (formula IIIb) (1999).

* cited by examiner

*Primary Examiner* — Alan D Diamond
(74) *Attorney, Agent, or Firm* — Drinker Biddle & Reath LLP

(57) ABSTRACT

The present invention refers to a red-dyeing acid dye mixture comprising a dye of the formula (I)

(I)

and at least one dye of the formula (II)

(II)

a process for its manufacturing and a process for dyeing and printing of natural or synthetic polyamide fiber material in which it used.

24 Claims, No Drawings

ACID DYE MIXTURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED APPLICATIONS

This application claims benefit under 35 U.S.C. 119(e) to Ser. No. 60/650,475, filed Feb. 7, 2005.

The present invention relates to the field of acid dyes. Acid dyes are known and can be used for dyeing and printing of natural and synthetic polyamide fiber material.

The documents U.S. Pat. No. 4,537,598, U.S. Pat. No. 5,090,964, U.S. Pat. No. 5,131,919 and U.S. Pat. No. 6,443,998 describe mixtures of red-dyeing acid dyes, which can also be used for dyeing and printing of polyamide fiber and which are suitable for combination dyeing by the trichromatic technique.

However, the known dyes and dyestuff mixtures, respectively, have some disadvantages as regards applicability in the dyehouse as well as regards fastness properties of the dyed material.

It is an object of the present invention to provide improved red-dyeing mixtures of acid dyes which are suitable for dyeing or printing of natural or synthetic polyamide fiber material from an aqueous bath and show good exhaustion especially in combination with other dyes, in particular from short liquors and have very good levelling and fastness properties especially light fastness properties.

The present invention relates to a dye mixture comprising a dye of the formula (I)

(I)

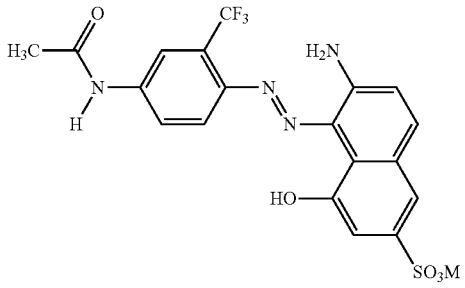

wherein M is hydrogen, an alkali metal, an ammonium ion or the equivalent of an alkaline earth metal, and at least one dye of the formula (II)

(II)

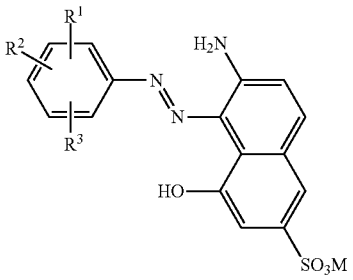

wherein $R^1$ is hydrogen, $(C_1\text{-}C_8)$-alkyl, $(C_1\text{-}C_8)$-alkyl which is substituted by halogen, halogen, benzoylamino, benzoylamino, which is substituted in the phenyl ring by halogen, —$SO_2$-phenyl, —$SO_2$-phenyl, which is substituted in the phenyl ring by $(C_1\text{-}C_8)$-alkyl, —$SO_2$—O-phenyl, 1-azacycloheptan-N-sulfonyl, or a group of the formula (III)

(III)

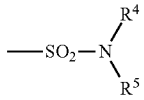

in which $R^4$ is $(C_1\text{-}C_8)$-alkyl, $(C_3\text{-}C_8)$-cycloalkyl, phenyl or phenyl which is substituted by $(C_1\text{-}C_8)$-alkyl and $R^5$ is hydrogen or $(C_1\text{-}C_8)$-alkyl;

$R^2$ is hydrogen, halogen, $(C_1\text{-}C_8)$-alkyl or a group of the formula (IV)

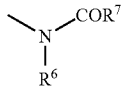

wherein $R^6$ is hydrogen, methyl or ethyl; and $R^7$ is $(C_1\text{-}C_6)$-alkyl, phenyl or —CO—O—$(C_3\text{-}C_8)$-cycloalkyl $R^3$ is hydrogen, halogen or $(C_1\text{-}C_8)$-alkyl;

M is hydrogen, an alkali metal, an ammonium ion or the equivalent of an alkaline earth metal, whereas formula (II) does not include a dye of formula (I) and whereas mixtures comprising a dye of the formula (I) and a dye of the formula (II), wherein $R^1$ is trifluoromethyl and $R^2$ and $R^3$ are both hydrogen and a dye of the formula (II), wherein $R^1$ is a group of the formula (III) in which $R^4$ is cyclohexyl and $R^5$ is methyl and $R^2$ and $R^3$ are both hydrogen, are excluded and whereas mixtures consisting of the dye of the formula (I) and a dye of the formula (II), wherein $R^1$ is trifluoromethyl and $R^2$ and $R^3$ are both hydrogen, are excluded.

$(C_1\text{-}C_8)$-alkyl groups may be straight-chain or branched and are for example methyl, ethyl, n-propyl, i-propyl, n-butyl, i-butyl, tert.-butyl, pentyl, hexyl, heptyl or octyl. Preferred are $(C_1\text{-}C_4)$-alkyl groups, like methyl, ethyl, n-propyl and n-butyl.

$(C_3\text{-}C_8)$-cycloalkyl is preferably cyclohexyl.

Halogen is preferred fluorine, chlorine and bromine. Accordingly, a $(C_1\text{-}C_8)$-alkyl group, which is substituted by halogen is preferably substituted by fluorine, chlorine or bromine. An especially preferred $(C_1\text{-}C_8)$-alkyl group, which is substituted by halogen, is trifluoromethyl.

Halogen standing for $R^2$ or $R^3$ is preferably fluorine, chlorine and bromine and especially preferred chlorine.

A substituted phenyl group standing for $R^4$ is preferred substituted by methyl.

M is preferably hydrogen, sodium or potassium.

Preferred dyes of the formula (II) are the dyes of the formulae (IIa) to (IIp)

(IIa)
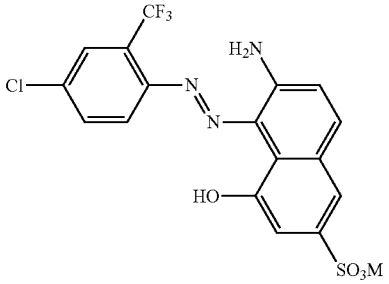
(IIb)
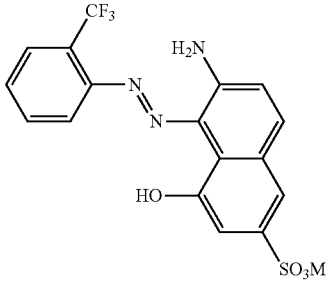
(IIc)
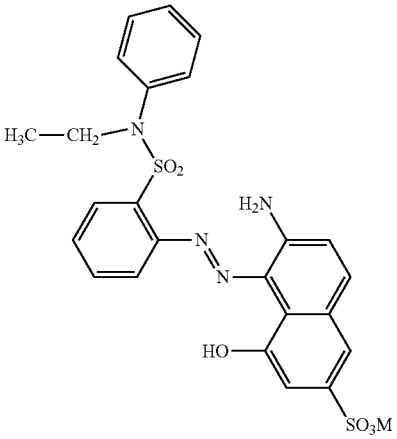
(IId)
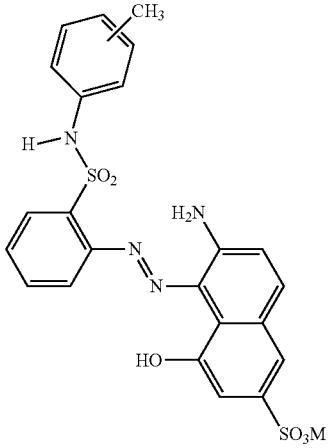
-continued
(IIe)
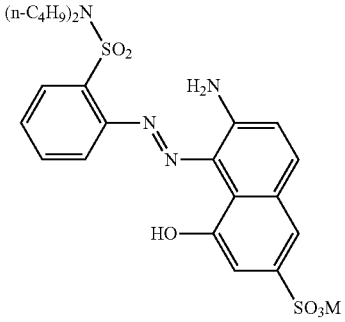
(IIf)
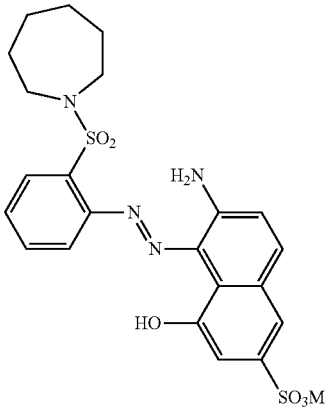
(IIg)
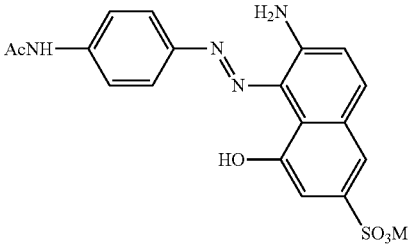
(IIh)
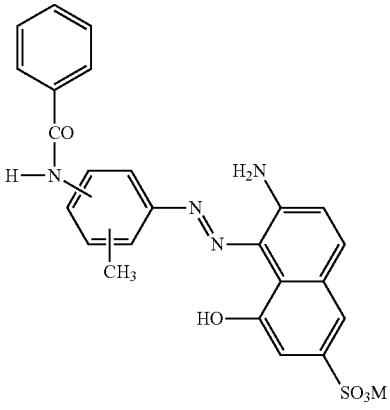

-continued (IIi)

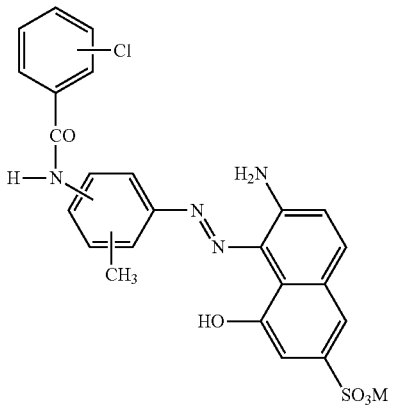

(IIk)

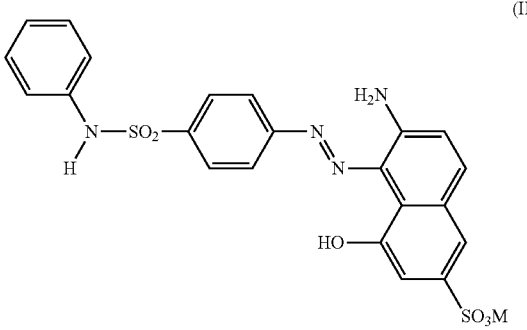

(IIl)

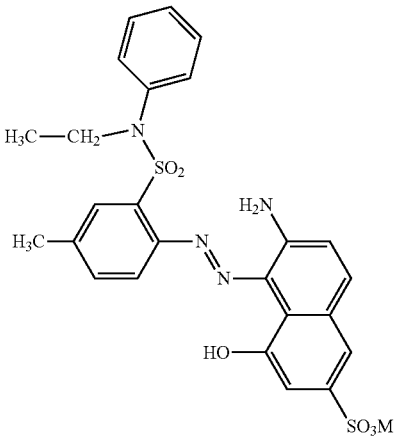

(IIm)

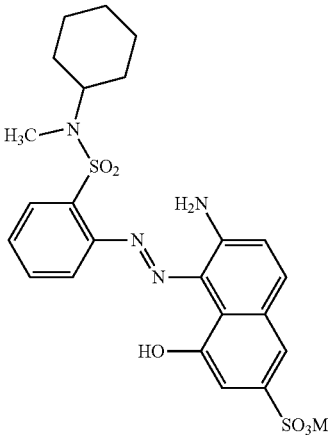

-continued (IIn)

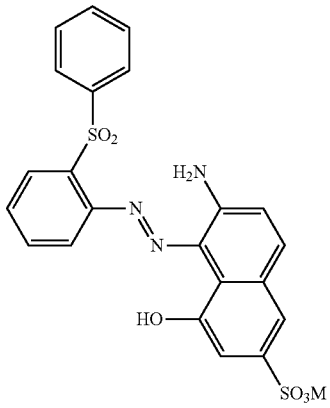

(IIo)

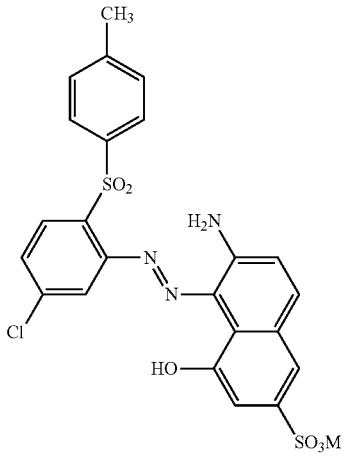

(IIp)

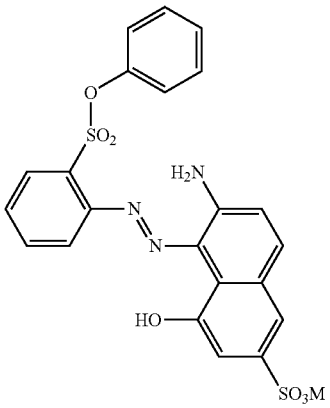

wherein M is defined as given above.

A preferred dye mixture comprises a dye of the formula (I) and a dye of the formula (IIa) or a dye of the formula (IIm).

Another preferred dye mixture consists of a dye of the formula (I) and a dye of the formula (IIa) or a dye of the formula (IIm).

Still another preferred dye mixture comprises a dye of the formula (I) and at least two dyes of the formula (II), one of which is a dye of the formula (IIb).

Still another preferred dye mixture comprises a dye of the formula (I) and a dye of the formula (IIa) and a dye of the formula (IIb) or (IIm).

The dye mixtures according to the present invention contain the dye of the formula (I) preferably in amounts of 5 to 95% by weight and the dye or the dyes of the formula (II) preferably in amounts of 95 to 5% by weight. The dye mixtures according to the present invention contain the dye of the formula (I) especially preferably in amounts of 40 to 80% by weight and the dye or the dyes of the formula (II) especially preferably in amounts of 60 to 20% by weight.

The present invention also relates to dye mixtures which comprise 90 to 99.99% by weight of a dye mixture comprising a dye of the formula (I) and at least one dye of the formula (II) and 10 to 0.01% by weight of one or more shading agents.

Shading agents are dyes which can be used to modify the shade of the inventive dye mixtures in order to adjust it to a certain shade standard.

Preferred shading agents are acid dyes of yellow, orange or blue color or other dyes of yellow, orange or blue color which can be used together with the inventive dye mixture.

Especially preferred shading agents are the yellow, orange and blue dyes mentioned below.

The present invention also relates to a process for the manufacturing of the dye mixture of the present invention, which comprises mechanical mixing of the dye of the formula (I) and the dye or the dyes of the formula (II) in the required amounts. The dyes of the formulae (I) and (II) are known and can be purchased at the market place or produced in line with methods known to those skilled in the art.

The dye mixtures of the present invention are suitable for dyeing and printing of natural or synthetic polyamide fiber material by the application methods numerously described in the art for acid dyes. Therefore, the present invention also relates to a process for dyeing and printing of natural or synthetic polyamide fiber material in which a dye mixture according to the present invention is used.

A preferred natural polyamide fiber material is wool, whereas preferred synthetic polyamide fiber materials are nylon materials, like nylon-6 and nylon-6.6.

The inventive dye mixtures are especially suitable for combination dyeing by the trichromatic technique. According to this method, the inventive red-dyeing mixtures are used together or in mixture with suitable blue-dyeing dyes or dye mixtures and suitable yellow- or orange-dyeing dyes or dye mixtures.

Therefore, the present invention also relates to a process for trichromatic dyeing and printing of natural or synthetic polyamide fiber material in which a dye mixture according to the present invention is used, together with at least one blue-dyeing dye or dye mixture and at least one yellow- or orange-dyeing dye or dye mixture.

Preferred blue-dyeing dyes are the dyes of the formula (IIIa)

(IIIa)

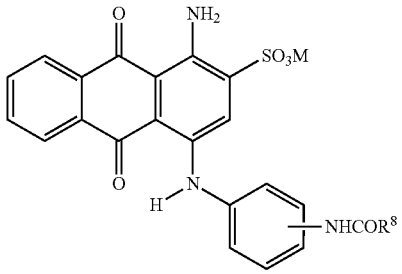

wherein $R^8$ is methyl or ethyl and M is defined as given above.

Preferred dyes of the formula (IIIa) are the dyes of the formulae (IIIb) and (IIIc)

(IIIb)

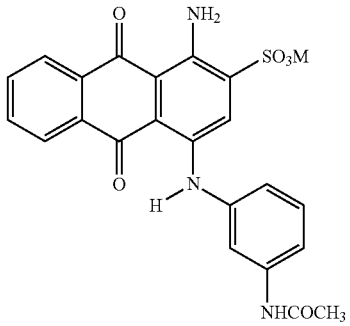

(IIIc)

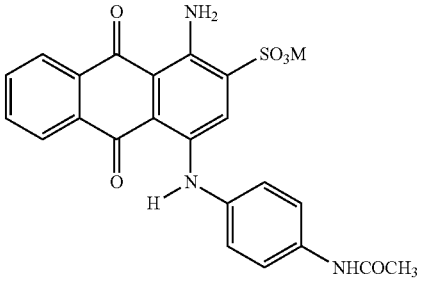

Other preferred blue-dyeing dyes are the dyes of the formulae (IIId) to (IIIh)

(IIId)

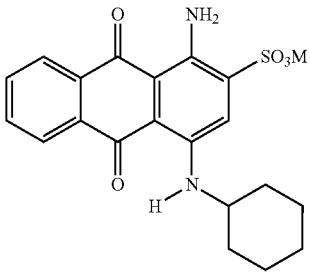

(IIIe)

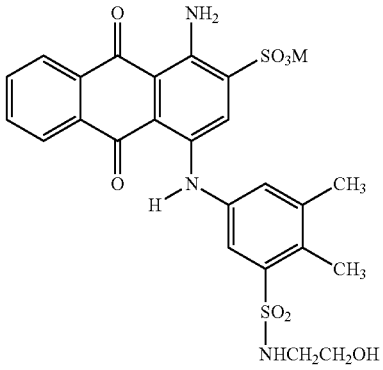

-continued
(IIIf)
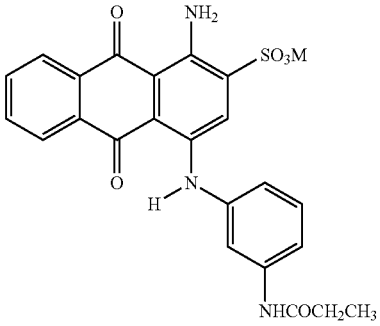
(IIIg)
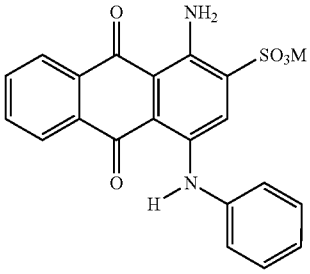
(IIIh)
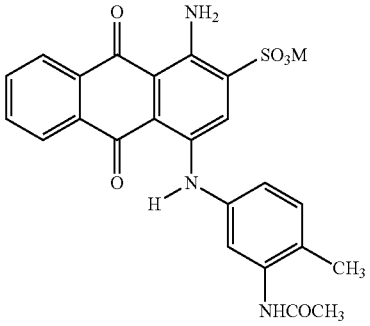
wherein M is defined as given above and mixtures of two or more dyes of the formulae (IIIa) to (IIIh).
Preferred yellow- or orange-dyeing dyes are the dyes of the formulae (IVa) to (IVh)
(IVa)
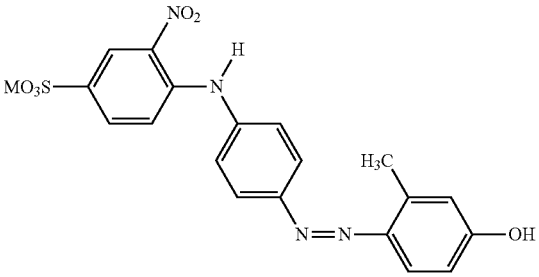
-continued
(IVb)
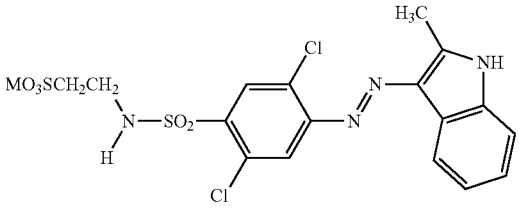
(IVc)
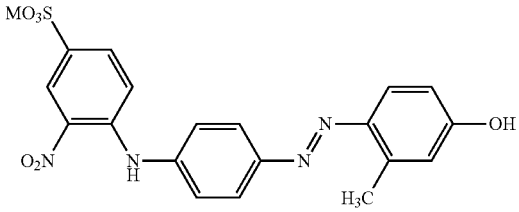
(IVd)
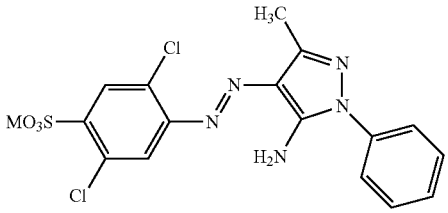
(IVe)
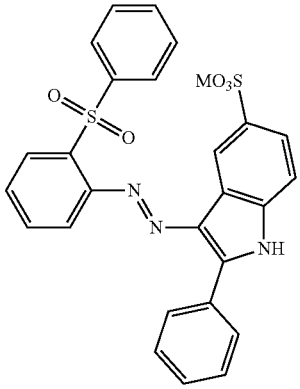
(IVf)
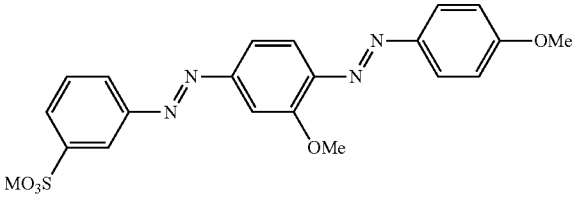
(IVg)
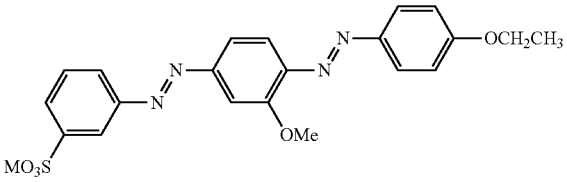

-continued (IVh)

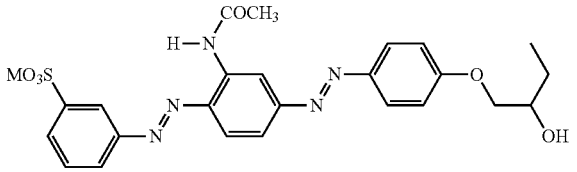

wherein M is defined as given above and mixtures of two or more dyes of the formulae (IVa) to (IVh).

A preferred yellow- or orange-dyeing mixture a mixture comprising a dye of the formula (IVa) and a dye of the formula (IVi)

(IVi)

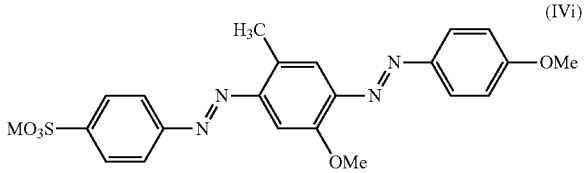

wherein M is defined as given above.

The mixture comprising a dye of the formula (IVa) and a dye of the formula (IVi) contain the dye of the formula (IVa) preferably in amounts of 5 to 95% by weight and the dye of the formula (IVi) preferably in amounts of 95 to 5% by weight. Especially preferred are 40 to 60% by weight of a dye of the formula (IVa) and 60 to 40% by weight of a dye of the formula (IVi).

Using usual exhaust or continuous dyeing and printing techniques, which are known to a person skilled in the art, the inventive dye mixture shows improved on-tone build-up in combination with a blue-dyeing dye and/or a yellow- or orange dyeing dye or dye mixture thereof.

On critical fiber material, e.g. high-delustered, pre-heat-setted micro-fibers, the present invention shows improved light fastness due to on-tone fading.

Example 1

To prepare a dye mixture comprising a dye of the formula (I) and a dye of the formula (IIa), 60 parts of the dye of the formula (I) in form of its sodium salt and 40 parts of the dye of the formula (IIa) in form of its sodium salt are mixed homogeneously to give 100 parts of the dye mixture which hereafter is called mixture A.

Example 2

To prepare a dye mixture comprising a dye of the formula (I) and a dye of the formula (IIm), 25 parts of the dye of the formula (I) in form of its sodium salt and 75 parts of the dye of the formula (IIm) in form of its sodium salt are mixed homogeneously to give 100 parts of the dye mixture which hereafter is called mixture B.

Example 3

To prepare a dye mixture comprising a dye of the formula (I), a dye of the formula (IIa) and a dye of the formula (IIb), 50 parts of the dye of the formula (I) in form of its sodium salt, 40 parts of the dye of the formula (IIa) in form of its sodium salt and 10 parts of the dye of the formula (IIb) in form of its sodium salt are mixed homogeneously to give 100 parts of the dye mixture which hereafter is called mixture C.

Example 4

10 parts of a nylon-6,6 material (Helanca fabric) are dyed in 200 parts of an aqueous solution containing 2 g/l ammonium acetate and having a pH-value of 5 which has been adjusted with acetic acid. The dyes that are used are 0.10% of the red dyeing mixture A according to Example 1, 0.15% of a orange dyeing dyestuff mixture comprising equimolar amounts of the dye of the formula (IVa) and the dye of the formula (IVi) and 0.12% of the blue-dyeing dye of the formula (IIIb), the amounts given being based on the weight of the Helanca fabric. All dyes were used in form of their sodium salts.

The dyeing time at a temperature of 60 to 90° C. is 30 to 90 minutes. After that, the dyed nylon-6,6 fabric is removed from the liquor, rinsed and dried as usual. This gives a piece of fabric completely levelly dyed in a brown shade having no material-related streaks whatever and high light fastness properties.

Examples 5 to 11

Example 4 is repeated with the difference that the dyes and dye mixtures, respectively, and the amounts given in the following table were used. All dyeings obtained were completely level and with high light fastness properties.

| Example | Dyes used | Shade |
|---|---|---|
| 5 | 0.035% of an equimolar mixture of the dyes of formulae (IVa) and (IVi)<br>0.023% of Mixture A<br>0.063% of the dye of the formula (IIIb) | light grey |
| 6 | 0.060% of an equimolar mixture of the dyes of formulae (IVa) and (IVi)<br>0.005% of Mixture A<br>0.075% of the dye of the formula (IIIb) | olive |
| 7 | 0.021% of an equimolar mixture of the dyes of formulae (IVa) and (IVi)<br>0.027% of Mixture A<br>0.020% of the dye of the formula (IIIb) | brown |
| 8 | 0.035% of an equimolar mixture of the dyes of formulae (IVa) and (IVi)<br>0.023% of Mixture B<br>0.063% of the dye of the formula (IIIb) | light grey |
| 9 | 0.021% of an equimolar mixture of the dyes of formulae (IVa) and (IVi)<br>0.027% of Mixture B<br>0.020% of the dye of the formula (IIIb) | brown |
| 10 | 0.035% of an equimolar mixture of the dyes of formulae (IVa) and (IVi)<br>0.023% of Mixture C<br>0.063% of the dye of the formula (IIIb) | light grey |
| 11 | 0.021% of an equimolar mixture of the dyes of formulae (IVa) and (IVi)<br>0.027% of Mixture C<br>0.020% of the dye of the formula (IIIb) | brown |

The invention claimed is:

1. A dye mixture comprising a dye of the formula (I)

(I)

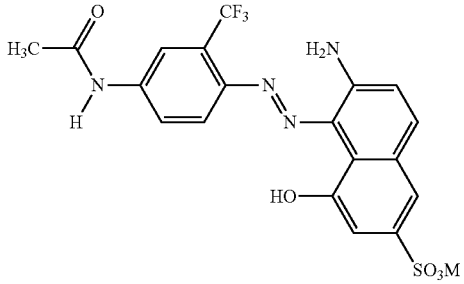

wherein M is hydrogen, an alkali metal, an ammonium ion or the equivalent of an alkaline earth metal, and at least one dye of the formula (IIa) or (IIb)

(IIa)

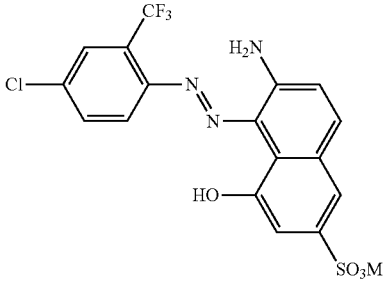

(IIb)

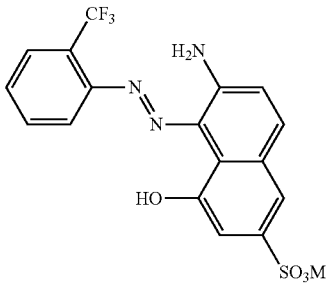

M is defined above, and at least one dye of the formula (IIIc), (IIId), (IIIe) or (IIIg)

(IIId)

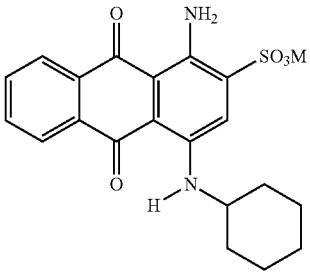

-continued (IIIc)

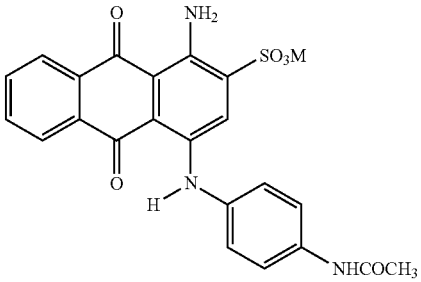

(IIIe)

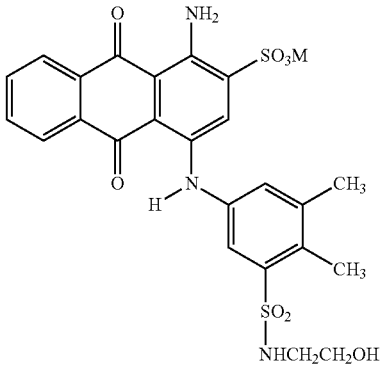

(IIIg)

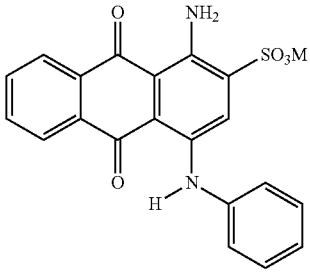

wherein

M is defined above.

2. The dye mixture according to claim 1, wherein M is hydrogen, sodium or potassium.

3. A process for the manufacturing of the dye mixture according to claim 1, which comprises mechanical mixing of the dye of the formula (I) and the dye or the dyes of the formula (IIa) or (IIb) and at a dye of the formula (IIIc), (IIId), (IIIe) or (IIIg).

4. A process for dyeing and printing of natural or synthetic polyamide fiber material which comprises applying said dye mixture according to claim 1 to said material.

5. A process for trichromatic dyeing and printing of natural or synthetic polyamide fiber material which comprises applying to said material said dye mixture according to claim 1 together with at least one blue-dyeing dye or dye mixture and at least one yellow- or orange-dyeing dye or dye mixture.

6. The process according to claim 5, wherein a dye selected from the group consisting of the dyes of formulae (IVa) to (IVh)

(IVa)

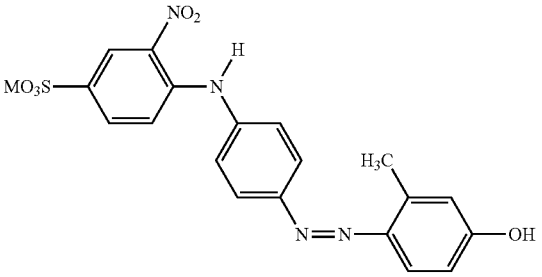

(IVb)

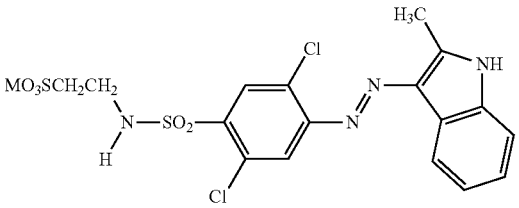

(IVc)

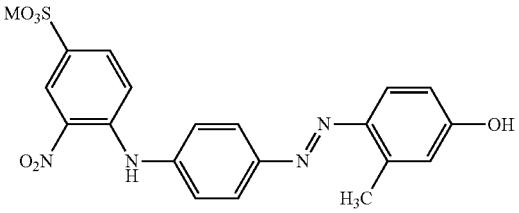

(IVd)

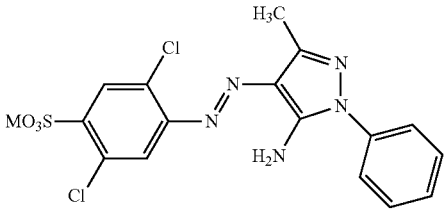

(IVe)

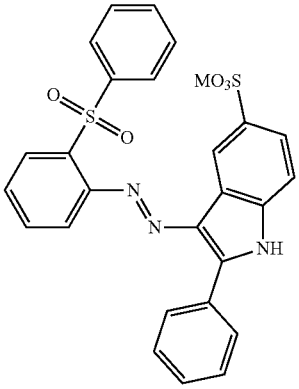

(IVf)

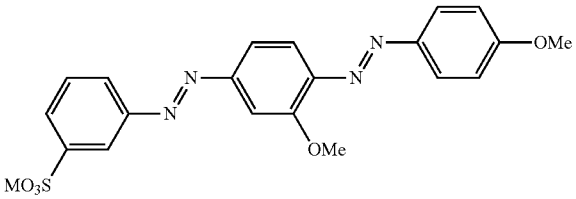

-continued (IVg)

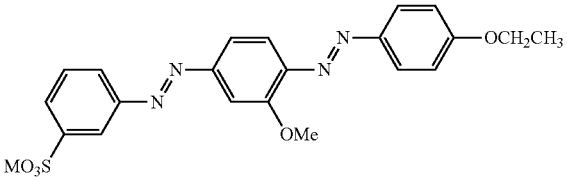

(IVh)

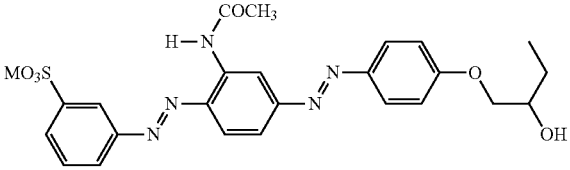

wherein M *is* hydrogen, an alkali metal, an ammonium ion or the equivalent of an alkaline earth metal, or mixtures of two or more dyes of the formulae (IVa) to (IVh) are used as yellow- or orange dyeing dye.

7. The process according to claim 6, wherein a mixture of a dye of the formula (IVa) and a dye of the formula (IVi)

(IVi)

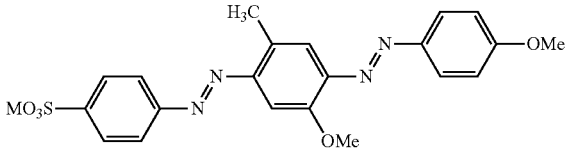

wherein M is hydrogen, an alkali metal, an ammonium ion or the equivalent of an alkaline earth metal, is used as yellow or orange dyeing dye.

8. The dye mixture as claimed in claim 1, which further comprises at at least one dye selected from the group consisting of the dyes of formulae (IVa) to (IVh)

(IVa)

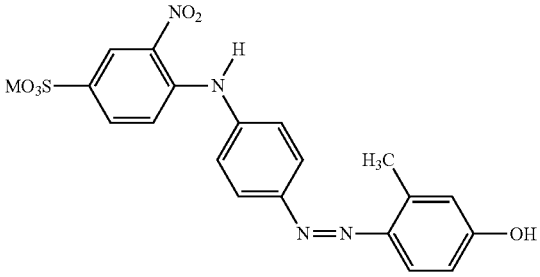

(IVb)

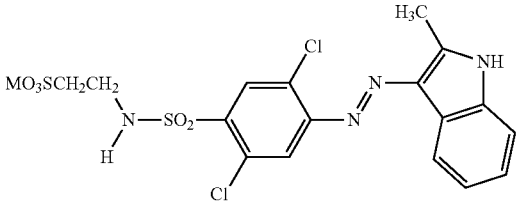

-continued (IVc)

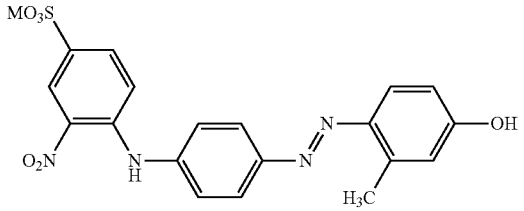

(IVd)

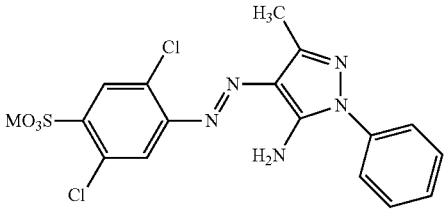

(IVe)

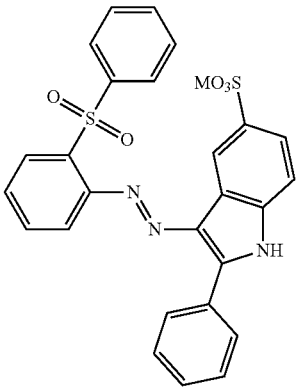

(IVf)

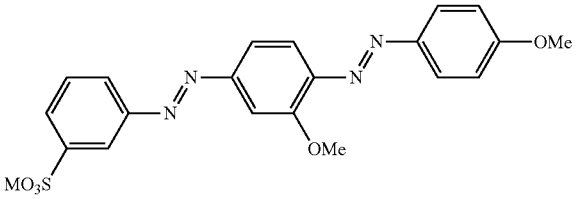

(IVg)

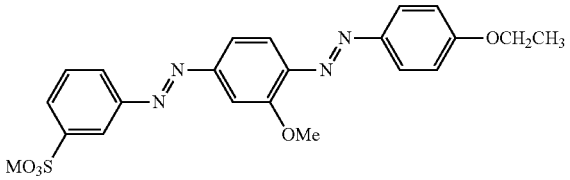

(IVh)

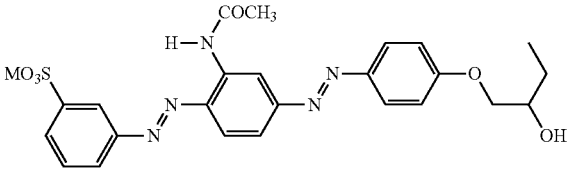

wherein M *is* hydrogen, an alkali metal, an ammonium ion or the equivalent of an alkaline earth metal.

9. The dye mixture as claimed in claim 8, wherein at least one dye of the formula (IVb), (IVd), (IVe) or (IVf) is used and at least one of the dyes of the formula (IIId), (IIIe) or (IIIg) is used.

10. The dye mixture according to claim 1, consisting of the dye of the formula (I), the dye of the formulas (IIa) or (IIb) or the dye of formula (IIa) and (IIb) and at least one dye of the formula (IIIc), (IIId), (IIIe) or (IIIg) and optionally comprises at least one dye selected from the group consisting of the dyes of formulae (IVa) to (IVh)

(IVa)

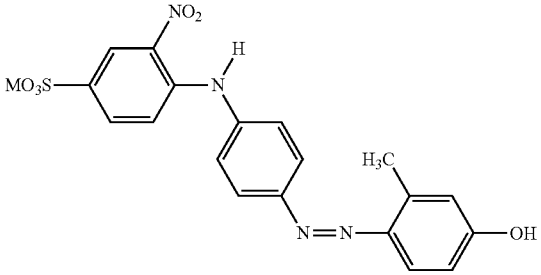

(IVb)

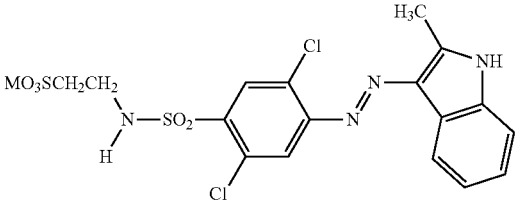

(IVc)

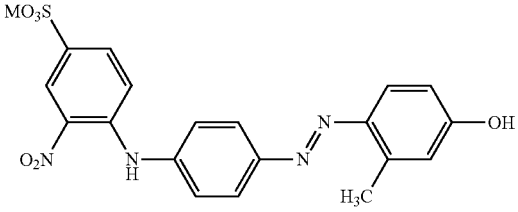

(IVd)

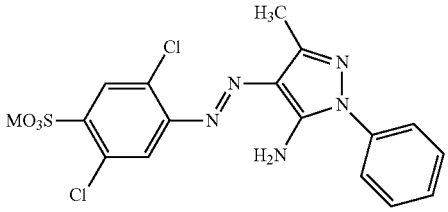

(IVe)

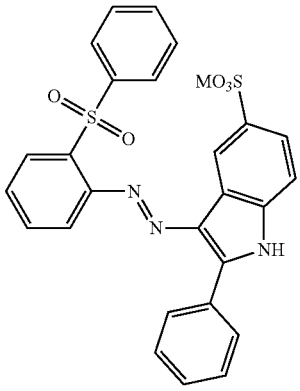

-continued (IVf)

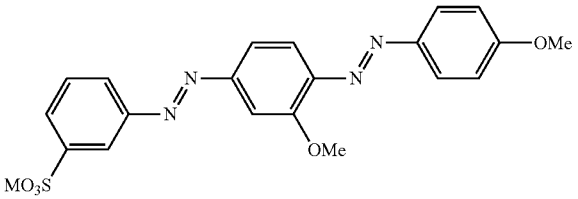

(IVg)

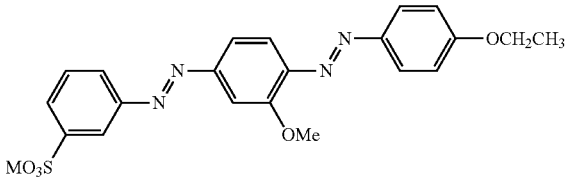

(IVh)

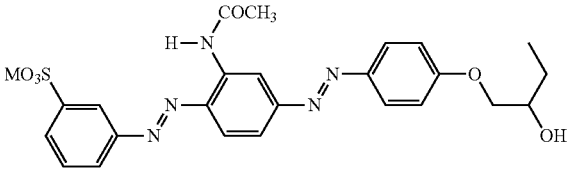

wherein M *is* hydrogen, an alkali metal, an ammonium ion or the equivalent of an alkaline earth metal.

11. A dye mixture comprising a dye of the formula (I)

(I)

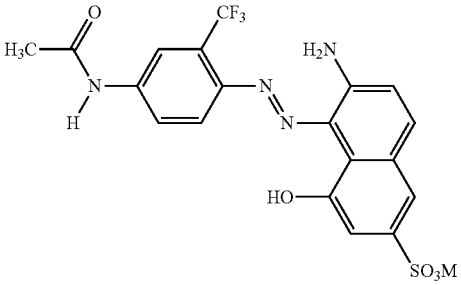

wherein M is hydrogen, an alkali metal, an ammonium ion or the equivalent of an alkaline earth metal, and at least one dye of the formula (IIa) or (IIb)

(IIa)

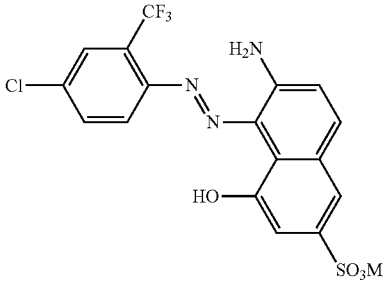

-continued (IIb)

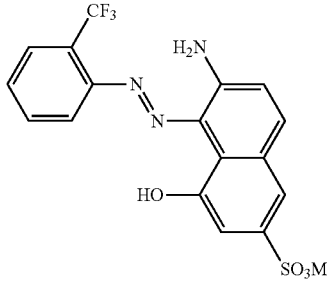

M is defined above, and at least one dye of the formula (IVb), (IVd), (IVe) or (IVf)

(IVb)

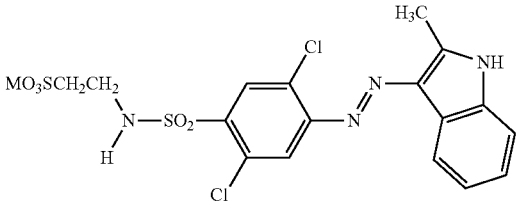

(IVd)

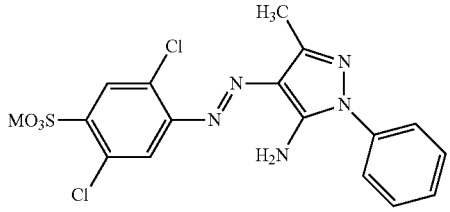

(IVe)

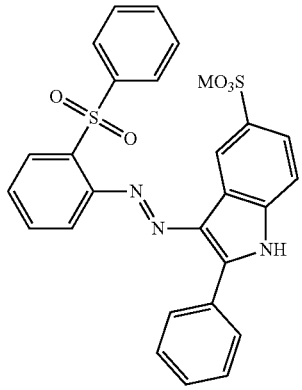

(IVf)

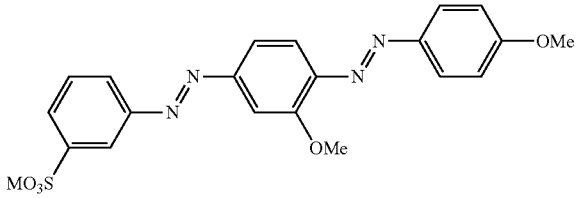

wherein M is defined above.

12. The dye mixture as claimed in *claim* 11, which further comprises at least one dye selected from the group consisting of the dyes of formulae (IIIb) to (IIIh)

(IIIb)

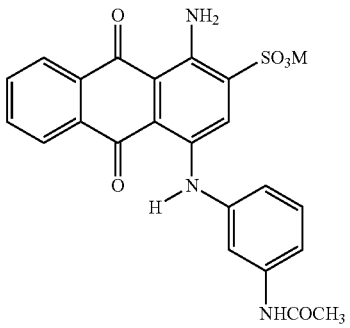

(IIIc)

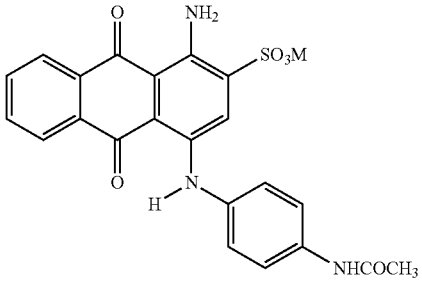

(IIId)

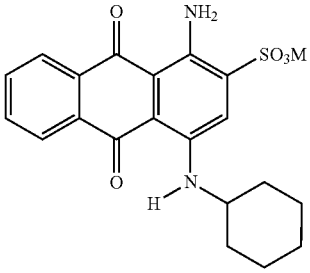

(IIIe)

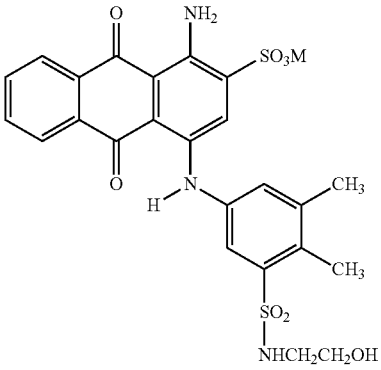

(IIIf)

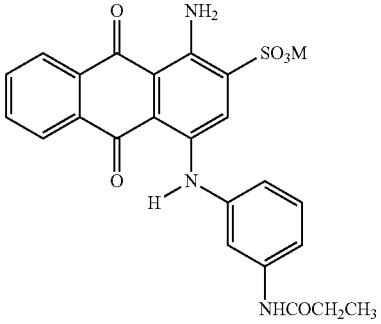

-continued (IIIg)

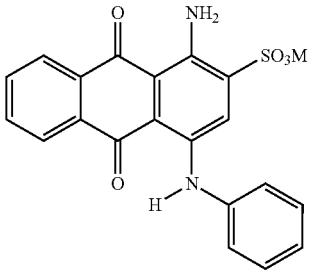

(IIIh)

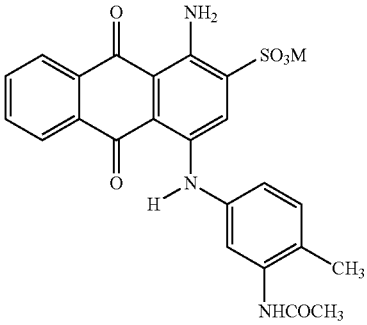

wherein M is hydrogen, an alkali metal, an ammonium ion or the equivalent of an alkaline earth metal.

13. The dye mixture as claimed in *claim* 12, wherein a dye of the formula (IIIc), (IIId)[.], (IIIe) or (IIIg) *is used*.

14. The dye mixture according to claim 11, wherein M is hydrogen, sodium or potassium.

15. A process for the manufacturing of the dye mixture according to claim 11, which comprises mechanical mixing of the dye of the formula (I) and the dye or the dyes of the formula (IIa) or (IIb) and at least one dye of the formula (IVb), (IVd), (IVe) or (IVf).

16. A process for dyeing and printing of natural or synthetic polyamide fiber material which comprises applying said dye mixture according to claim 11 to said material.

17. A dye mixture consisting of a dye of the formula (I)

(I)

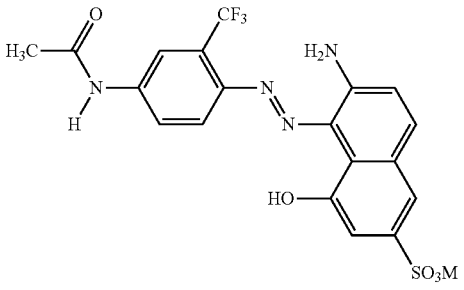

wherein M is hydrogen, an alkali metal, an ammonium ion or the equivalent of an alkaline earth metal, and at least one dye of the formula (IIa) or (IIb)
(IIa)
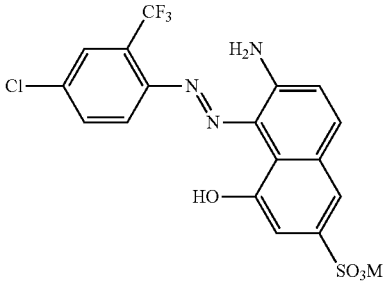
(IIb)
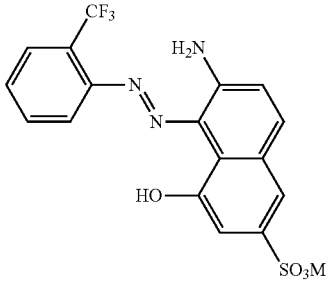
M is defined above,
and only one dye selected from the group consisting of the dyes of formulae (IIIb) to (IIIh)
(IIIb)
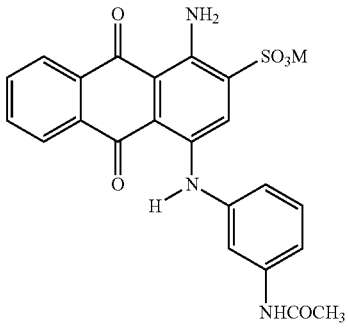
(IIIc)
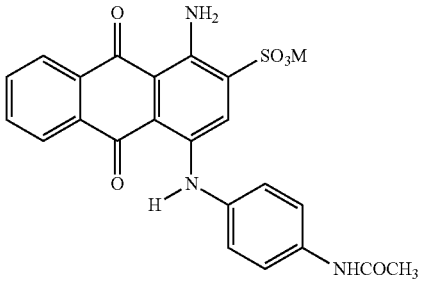
-continued
(IIId)
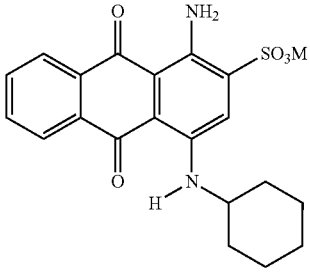
(IIIe)
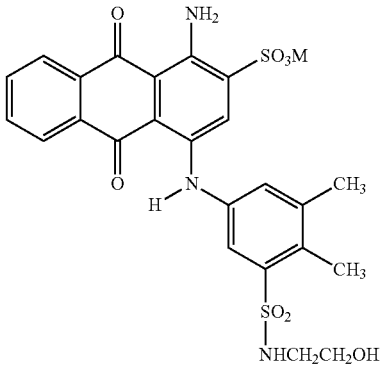
(IIIf)
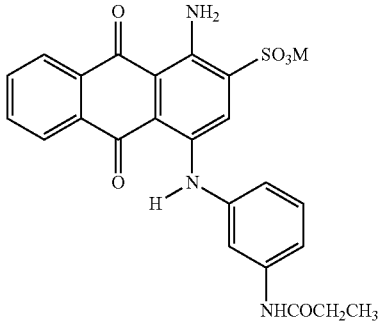
(IIIg)
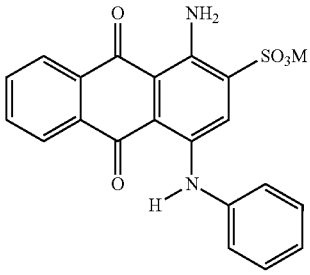
(IIIh)
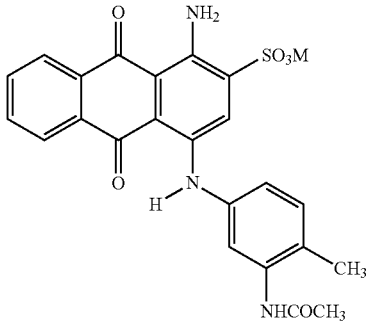
and [optionally] at least one dye selected from the group consisting of the dyes of formulae (IVa) to (IVh)

(IVa)

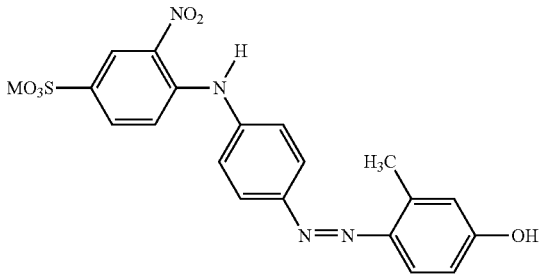

(IVb)

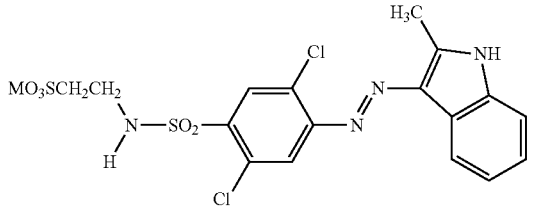

(IVc)

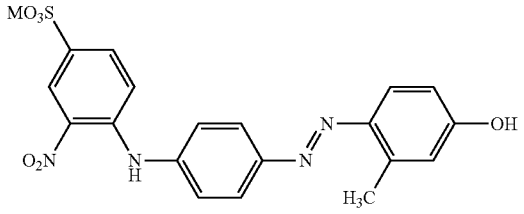

(IVd)

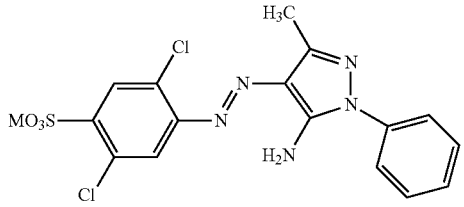

(IVe)

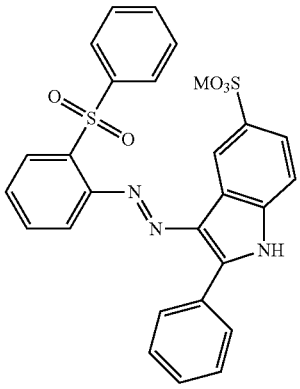

(IVf)

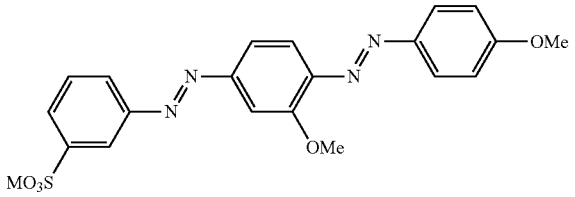

-continued (IVg)

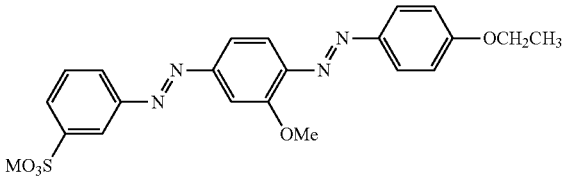

(IVh)

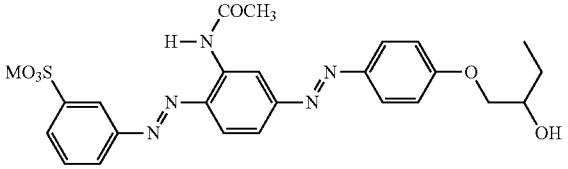

wherein M is defined above.

18. The dye mixture as claimed in claim 17, wherein the dye of the formula [dye of the formula] (IIIc), (IIId), (IIIe) or (IIIg) is used.

19. The dye mixture as claimed in claim 17, wherein the dye of the formula [dye of the formula] (IVb), (IVd), (IVe) or (IVf) is used.

20. A process for dyeing and printing of natural or synthetic polyamide fiber material which comprises applying said dye mixture according to claim 17 to said material.

*21. A dye mixture consisting of a dye of the formula (I)*

*(I)*

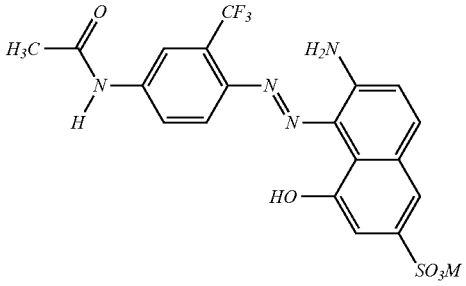

*wherein M is hydrogen, an alkali metal, an ammonium ion or the equivalent of an alkaline earth metal,*

*and at least one dye of the formula (IIa)*

*(IIa)*

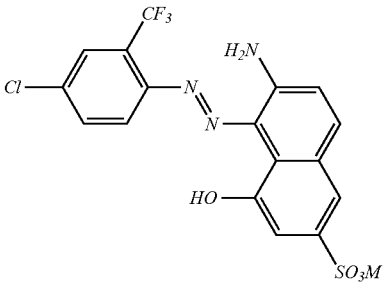

*M is defined above,*

*and only one dye selected from the group consisting of the dyes of formulae (IIIb) to (IIIh)*

(IIIb)
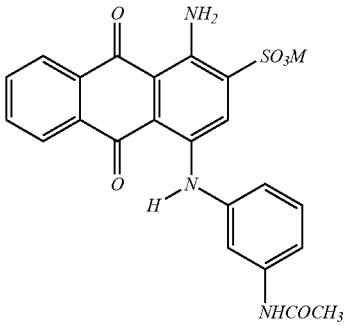
(IIIc)
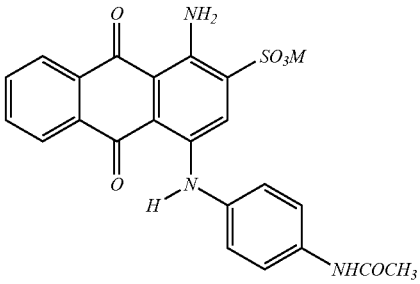
(IIId)
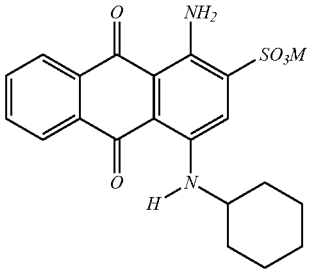
(IIIe)
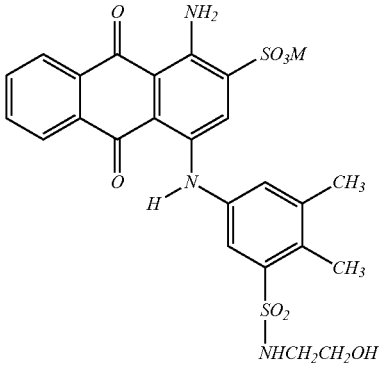
(IIIf)
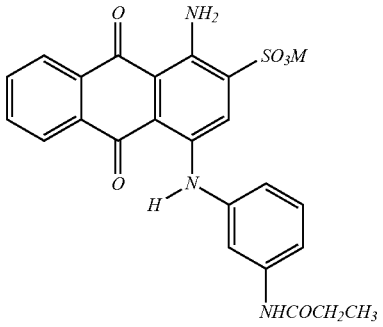
*-continued*
(IIIg)
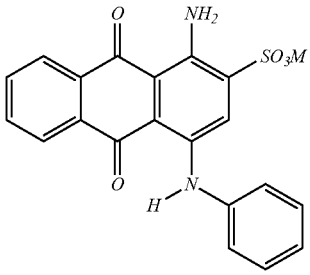
(IIIh)
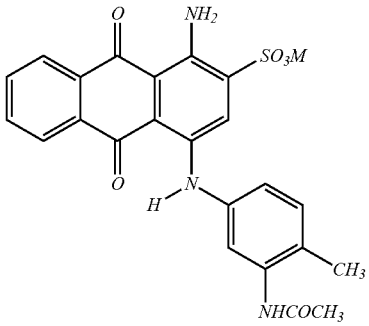
*and optionally at least one dye selected from the group consisting of the dyes of formulae (IVa) to (IVh)*
(IVa)
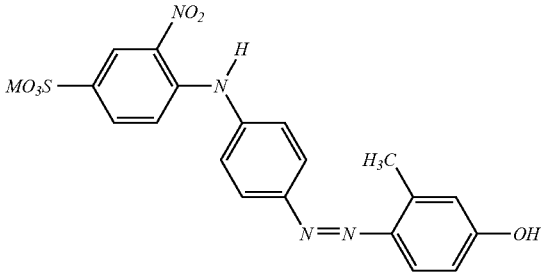
(IVb)
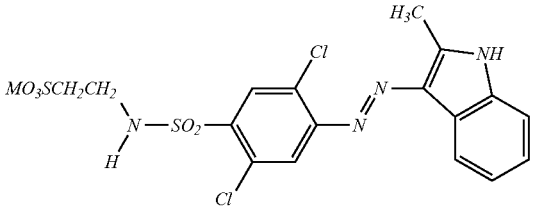
(IVc)
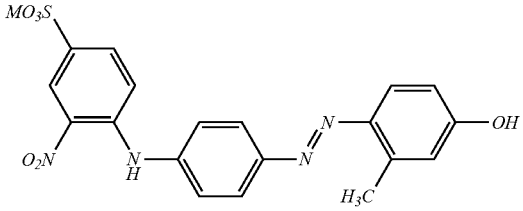

*-continued*

(IVd)

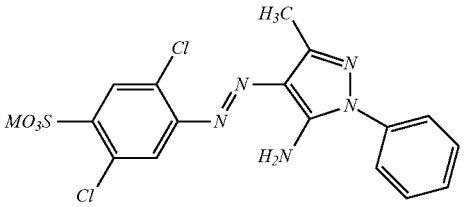

(IVe)

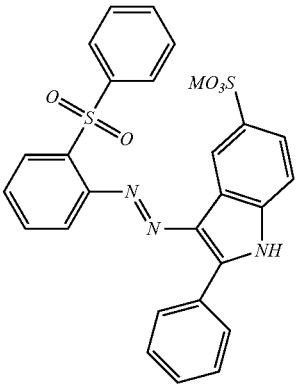

(IVf)

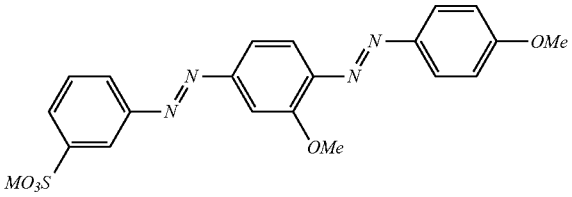

*-continued*

(IVg)

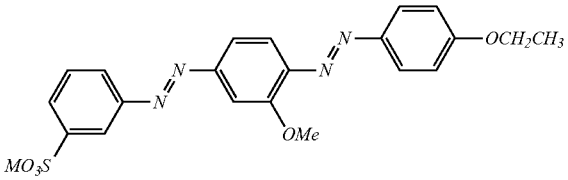

(IVh)

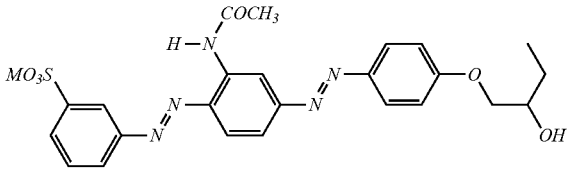

*wherein M is defined above.*

*22. The dye mixture as claimed in claim 21, wherein the dye of the formula (IIIc), (IIId), (IIIe) or (IIIg) is used.*

*23. The dye mixture as claimed in claim 21, wherein the dye of the formula (IVb), (IVd), (IVe) or (IVf) is used.*

*24. A process for dyeing and printing of natural or synthetic polyamide fiber material which comprises applying said dye mixture according to claim 21 to said material.*

* * * * *